Feb. 21, 1939. H. D. DUFAULT 2,148,368
BURNER APPARATUS
Filed April 19, 1938
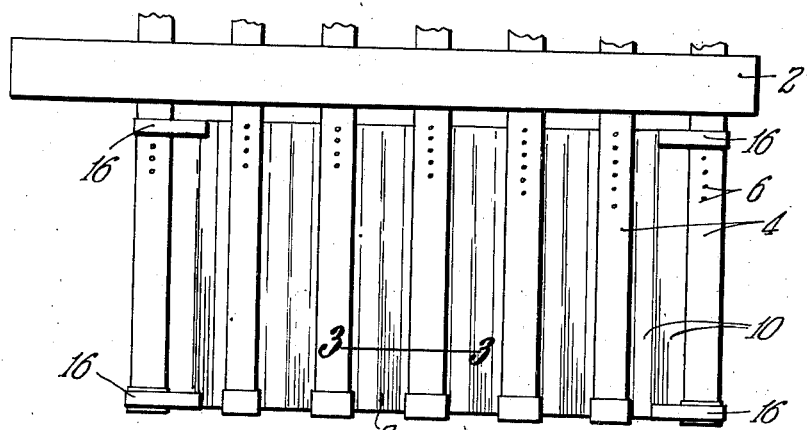
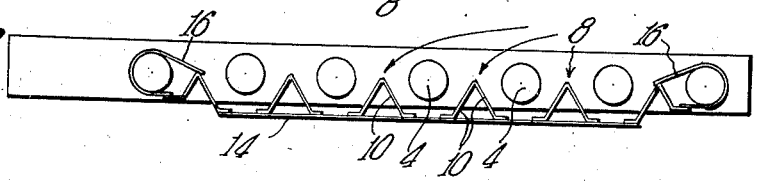
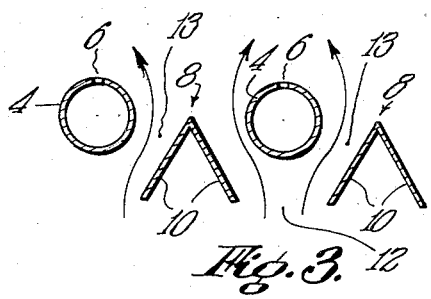
INVENTOR.
Homer D. Dufault.
BY
Walter C. Ross
ATTORNEY.

Patented Feb. 21, 1939

2,148,368

UNITED STATES PATENT OFFICE 2,148,368

BURNER APPARATUS

Homer D. Dufault, Easthampton, Mass., assignor to Holyoke Heater Company, Holyoke, Mass., a corporation of Massachusetts Application April 19, 1938, Serial No. 202,876

2 Claims. (Cl. 158—99)

This invention relates to improvements in burner apparatus and is directed more particularly to improvements to gas burner apparatus and the like.

Special features of the invention are directed to the provision of a burner apparatus having spaced runs or sections of perforated pipe or tubing. These are adapted to function as the burner bars and baffle members associated therewith are disposed in spaced relation and on an incline so as to be adapted to permit an upward flow of air adjacent the burner bars.

Apparatus of the type to which the invention relates is used in boilers, furnaces and the like and fuel such as gas is emitted from outlets of the burner bars with which a certain amount of air is needed for the desired combination. To facilitate the desired amount of air being admitted to the burner according to this invention there are provided baffles adjacent the burner bars disposed on an incline to provide openings below the bars so that air may pass upwardly around the said bars for mixing with the gas and at the same time have a cooling effect on the said bars.

Not only is the air necessary and desirable for purposes of combustion but in the form of the invention shown and described the baffles are arranged not only to provide slots but slots disposed beneath the bars in such a way that air is directed onto and upwardly past the bars.

The baffle plates underlying the burner bars are adapted to conduct material which may roll off the burner bars onto the said baffle plates. The baffle plates also aid in conducting material which falls from above downwardly between the burner bars. Since scale, dust and other objectionable foreign matter is continually falling it is desired that it be directed downwardly and away from the vicinity of the burner bars so that this matter is not allowed to pile up and collect around the burner bars. That is, the plates are sloping so that material flows off therefrom.

Various novel features of the invention are hereinafter described in connection with a burner apparatus having a plurality of spaced burner bars in adjacency but it will be understood that the invention is adapted for use in connection with one or more continuous bars which may be arranged spirally or otherwise to provide spaced portions.

The novel features and advantages of the invention will be hereinafter more fully referred to in connection with the accompanying description thereof reference being had to the accompanying drawing wherein:

Fig. 1 is a plan view of a burner apparatus embodying the novel features of the invention;

Fig. 2 is a front elevational view of the burner apparatus shown in Fig. 1; and

Fig. 3 is a sectional elevational view on the line 3—3 of Fig. 1.

Referring now to the drawing more in detail the invention will be fully described.

A supply header 2 is provided from which extend a plurality of spaced burner bars such as 4. The header may be connected to a fuel supply such as the gas supply line in the ordinary way and the burner bars are in the form of tubular members having outlets represented by 6 to emit fuel such as gas.

In the normal use of the apparatus it is set and supported in a boiler or furnace with the burner bars disposed substantially horizontally. A plurality of baffles indicated generally by 8 are disposed in spaced relation and between the burner bars 6. Each baffle preferably includes oppositely inclined plate-like members 10 which may be joined together at their upper sides as shown. The baffles are formed or spaced apart at their lower sides to provide openings such as 12 therebetween. In the form of the invention shown the baffles are joined to and supported by end members such as 14 so that the said baffle members constitute a unitary structure and the said structure is supported from the burner bars as by straps 16 or the like. Of course the plates may be integrally formed from a sheet of material and may be supported in any suitable manner relative to the burner bar. It will be appreciated that the baffle construction may be made in various ways in order to provide the angularly disposed inclined plates 10 and slots therebetween, the exact form of the baffle construction not being important.

As shown in Fig. 3 the baffle members are so formed and disposed as to form the slots 12 beneath the burner bars and passageways 13 between the plate 10 and burner 5. This is so that air may travel upwardly against and past the sides of the burner bars. This construction has been found to be very desirable and is to be distinguished from flat plates used as baffles.

The inclined plates have another function than that described. Whenever foreign matter such as scale and the like drops from the furnace surfaces it falls onto the inclined plates and is conducted away from the burner bars. It is common practice in connection with burners of this type to use substantially flat plates which of course allow boiler scale and the like to pile up thereon and which has many and various advantages and objections overcome by the present invention.

Having described the invention in the form at present preferred what it is desired to claim and secure by Letters Patent of the United States is:

1. A burner apparatus comprising in combination, a supply header member, a plurality of burner bar members extending substantially horizontally from said header member in spaced relation to provide substantially vertical slots therebetween, and a baffle structure supported by certain of said burner bar members, said baffle structure including relatively diverging plate members disposed beneath the slots extending longitudinally of said burner bar members with the lower ends of the plate members which are adjacent one another and in adjacent slots being spaced to form slots for the passage of air upwardly between said burner bars members and the plate members adjacent thereto.

2. A burner apparatus comprising in combination, a supply header member, a plurality of burner bar members extending substantially horizontally from said header member in spaced relation to provide substantially vertical slots therebetween, and a baffle structure supported by certain of said burner bar members, said baffle structure including pairs of relatively diverging plate members disposed beneath the slots extending longitudinally of said burner bar members with the upper ends of the plate members of a pair joined together and with the lower ends of adjacent plate members of adjacent pairs thereof spaced apart to form slots beneath the burner bar members, for the passage of air upwardly therethrough and between said burner bar members and the plate members adjacent thereto.

HOMER D. DUFAULT.